March 22, 1960
E. E. SEILER
2,929,335
LIQUID VALVES
Filed July 30, 1958
2 Sheets-Sheet 1
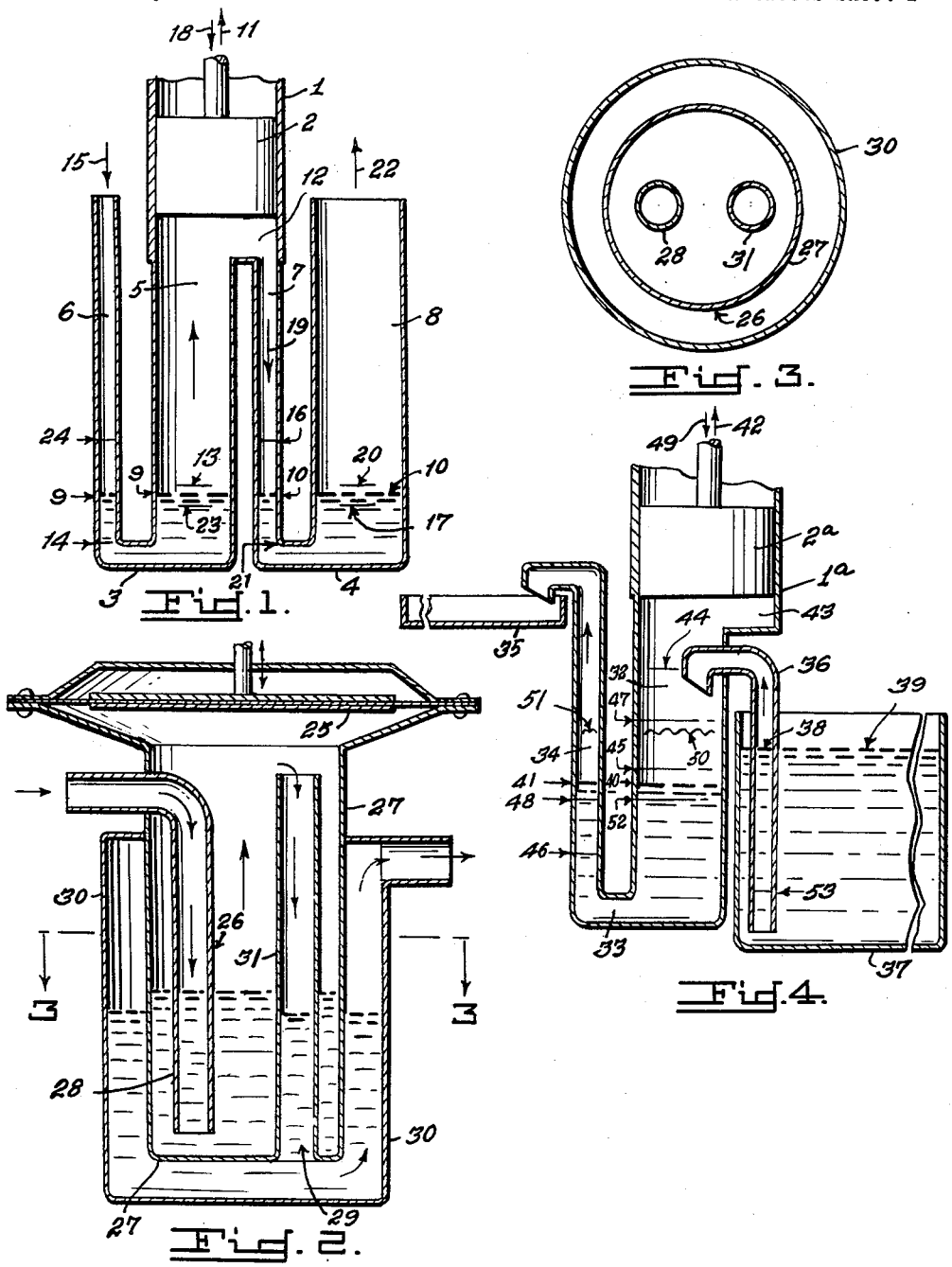
INVENTOR.
Ernst E. Seiler
BY
W. E. Thibodeau & A. J. Dupont March 22, 1960 E. E. SEILER 2,929,335
LIQUID VALVES
Filed July 30, 1958 2 Sheets-Sheet 2

INVENTOR.
Ernst E. Seiler
BY
W. E. Thibodeau & A. J. Dupont

2,929,335
LIQUID VALVES

Ernst E. Seiler, El Paso, Tex.

Application July 30, 1958, Serial No. 752,147

2 Claims. (Cl. 103—150)

(Granted under Title 35, U.S. Code (1952), sec. 266)

The invention described herein may be manufactured and used by or for the Government for governmental purposes, without the payment to me of any royalty thereon.

This invention relates to valves and more particularly to pump valves used in pumps for such gases and liquids which are antiseptic, corrosive, poisonous, sterile, contaminated with foreign articles, etc., and which should not come into contact with or hamper the mechanical operation of a pump having mechanical valves, pistons, etc., due to their corrosive action thereon.

It is therefore a primary object of this invention to provide a valve for use in a pump used for pumping gases and liquids that are required to remain clean, being poison, corrosive or contaminated without such liquid coming into contact with any moving parts of the pump or valve to adulterate the liquids.

The specific nature of the invention as well as other object and advantages thereof will clearly appear from a description of a preferred embodiment as shown in the accompanying drawings in which:

Fig. 1 is a schematic view showing the arrangement of elements of a valve of the invention adapted for use with a gas pump;

Fig. 2 illustrates a valve working on the same principle as the valve of Fig. 1, but constructed in a more compact arrangement.

Fig. 3 is a sectional view taken along line 3—3 of Fig. 2;

Fig. 4 is a schematic view of a valve showing the combination of elements in a valve used in a pump for pumping liquids;

Figure 5:
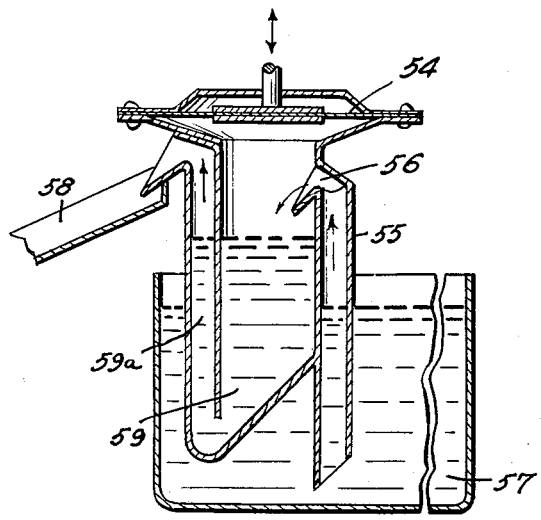
Fig. 5 illustrates the valve of Fig. 4 arranged in a more compact design.

Referring more particularly to the drawing in which Fig. 1 illustrates schematically an arrangement of elements of the invention as applied to a valve for use with a pump for gases, reference character 1 indicates a cylinder in which a piston 2 reciprocates. In communication with cylinder 1 is a pair of U-shaped tubes 3 and 4. U-shaped tube 3 consists of a large branch 5 connected to and communicating with cylinder 1 and a smaller branch 6 forming the input side of the valve. U-shaped tube 4 is similar to U-shaped tube 3 and consists of a small branch 7 in communication with cylinder 1 and a larger branch 8 forming the output side of the valve.

Tubes 3 and 4 are partially filled with a liquid and the normal liquid levels in these tubes are indicated by 9 and 10 as when the pump is inactive.

In operation, when piston 2 is moved in the direction indicated by 11 (the suction stroke) the pressure in the pump chamber 12 is decreased and atmospheric pressure, entering the smaller branch 6 of U-tube 3 as indicated by the arrow 15, will force the liquid in branch 6 into larger branch 7 until liquid levels indicated by 13 and 14 are reached. Gases will then bubble through the liquid in tube 3 and into large branch 5. At this stage of the cycle, the liquid levels in U-tube 4 will assume positions as indicated at 16 and 17 in branches 7 and 8 respectively. The inlet cycle is now completed.

When piston 2 moves in the direction 18, (the exhaust stroke) the pressure in chamber 12 will rise causing the gases to flow in the direction of arrow 19 into branch 7 of U-tube 4 and forcing the liquid level in branches 7 and 8 of U-tube 4 to assume position 20 and 21. The pumped gas will bubble through the liquid in U-tube 4 to be expelled through the large branch 8 of U-tube 4 as indicated by arrow 22 thus completing the exhaust cycle. During the exhaust cycle, the liquid in U-tube 3 assumes positions as indicated at 23 and 24.

Figs. 2 and 3 illustrate a more practical and compact design of the invention for employment in a fluid line. In this form a diaphragm 25 replaces the piston in the pump cylinder. One U-tube 26 consists of a large branch 27 with a smaller branch 28 located inside the large branch 27. The second U-tube 29 consists of a large branch 30 concentrically disposed about branch 27 and a smaller branch 31 located inside 27 of U-tube 26.

The valve shown in Fig. 2 operates on the same principle as the valve of Fig. 1.

Fig. 4 illustrates schematically an arrangement of the valve elements for use with a pump for pumping liquids and basically is similar to the arrangement of Fig. 1. A piston $2^a$ is mounted for reciprocation in cylinder $1^a$. The large branch 32 of U-tube 33 is in communication with the pump chamber 43 of cylinder $1^a$ and the smaller branch 34 of U-tube 33 empties into a suitable container as indicated at 35. A second U-tube consists of a smaller branch 36 and is in communication with large branch 32 and is bent over to be directed towards the downstream side of the branch 32. The larger branch of the second U-tube is represented by large container 37 which may be a pool, acid container, etc. Normal liquid levels in the container 37 is indicated by 39 and in the smaller branch 36 at 38. Normal liquid levels in U-tube 33 is indicated at 40 in the larger branch 32 and at 41 is the smaller branch 34.

The operation of the valve of Fig. 4 is similar to the valve of Fig. 1. When piston $1^a$ moves in the direction as indicated by the arrow 42, the pressure in the pump chamber 43 will be decreased and atmospheric pressure will cause the liquid in U-tube 33 to be forced into the larger branch 32 and into smaller branch 36 of the second U-tube until the liquid from the container 37 will flow into the larger branch 32 of U-tube 33. During this suction cycle, the liquid levels in the U-tubes will be at positions indicated as at 44 in branch 36, 45 in branch 32 and 46 in branch 34. The liquid entering the U-tube 33 will raise the level in its two branches 34 and 32 to positions indicated as at 47 in branch 32 and 48 in branch 34. The suction cycle is now complete.

When the piston $2^a$ is moved in the direction of arrow 49 (the exhaust cycle) pressure equilibriums between ambient pressure and the pressure in the pump chamber 43 is reached, the liquid level in U-tube 33 will be at approximately the positions indicated as at 50 in branch 32 and 51 in branch 34 resulting from the sucked in liquid. As piston $2^a$ continues in movement in the direction 49, the pressure increases in pump chamber 43 and the liquid of U-tube 33 will be forced toward its smaller branch 34 until the liquid flows into container 35 and the liquid level in the larger branch 32 of U-tube 33 will drop as liquid flows out until it reaches position indicated as at 52. The liquid level in the smaller branch 36 of the second U-tube will be at and remain at the position indicated at 53 during this cycle. The exhaust cycle is now complete. At no time during the suction cycle or exhaust cycle does the liquid come into contact with any moving structure of the pump.

Fig. 5 illustrates one form of design whereby the valve of Fig. 4 may be constructed in a compact arrangement. In this form, the piston 2ᵃ of the valve of Fig. 4 is replaced by a diaphragm type pump which is indicated as at 54. A small suction branch 55 having a wide outlet 56 opens at one end into a larger branch 59 and extends at its other end into the liquid of a container 57. A small outlet branch for large branch 59 is indicated by 59ᵃ and empties into a trough or like conveyor 58. In this form, one U-tube is represented by small branch 59ᵃ and large branch 59 while the other U-tube consists of the small branch 55 and large branch 57 (the container). The pump of Fig. 5 operates on the same principle as pump of Fig. 4.

Numerous advantages are afforded by the pump and valve of Fig. 5 i.e. in emptying ponds, etc. During the suction cycle liquid and foreign particles such as fish, paper, rags, debris, sea weed, etc., will be expelled with the liquid into the trough 58. No mechanical valves would be hampered by these foreign particles which normally would result in malfunction of a conventional type pump. Should the branch 55 become clogged by foreign particles during the suction cycle, the particles would be removed during the exhaust cycle since part of the liquid in branch 55 flows back to container 57.

The back and forth flow (pulsation) in the inlet and outlet branches results in a small loss of efficiency, however, when the valve is used on pumps for pumping contaminated liquid, the liquid inside the U-tubes will be activated and kept in motion throughout the operation of the pump. This continuous motion will avoid the settling down of the foreign particles and the prevention of clogging of the pump.

When the pump is used for draining fish ponds, fish and roe would remain alive if the suction height remains somewhat limited.

In using the pump for pumping out a flooded vessel, the continuous operation of the pump would not be hampered by articles, etc. The pump mechanism also will have a larger life due to none of the liquid being pumped coming into contact with moving parts of the pump and possible corrosion thereto.

Certain fluids must be kept clean and pure while they are being pumped from one container to another such as milk, pharmaceutical fluids, acids, etc. This would be insured by the valves of this invention.

Figure 6:
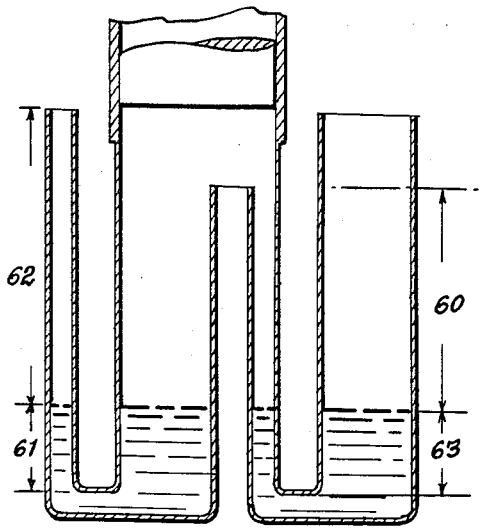
Fig. 6 is a view demonstrating the relation of the length of the U-tube branches in the valve of Fig. 1.
Figure 7:
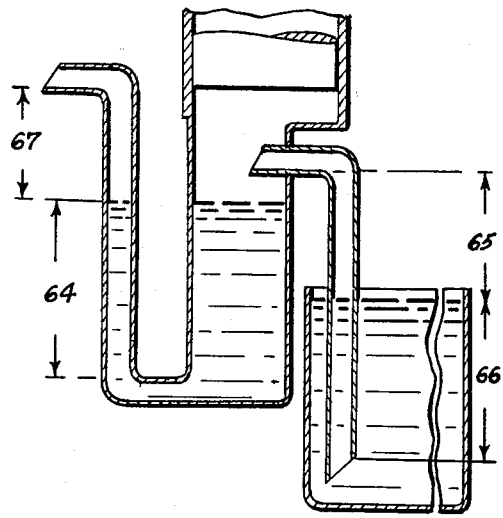
Fig. 7 is a view similar to Fig. 6 demonstrating the length of the U-tube branches when the valve is used in pumping liquids as in Fig. 4.

The suction and pressure heights in the U-tubes during the operation of the valves of the invention are demonstrated in Figs. 6 and 7.

Fig. 6 demonstrates these levels when the valve is used in a pump for pumping gases. During the suction stroke, length 60 represents the maximum in the larger branch of the second U-tube while 61 indicates the length in the smaller branch of the first U-tube. From this figure, it can be seen that length 60 is always longer than length 61. During the pressure stroke, the maximum pressure produced in the smaller branch of the second U-tube is indicated as at 62 while the length of the larger branch of the second U-tube is indicated at 63, thus length 62 is always longer than level 63.

The suction and pressure heights in the U-tubes of the valve when used in a pump for pumping liquids are demonstrated in Fig. 7. During the suction stroke, the height in the smaller branch of the second U-tube is indicated at 65 while 64 indicates the height in the smaller branch of the first U-tube. During the pressure stroke, the height in the larger branch of the second U-tube is indicated at 66 while the height in the smaller branch of the first U-tube is indicated by 67, thus height 66 is always longer than height 67.

The suction and pressure heights in the valves of this invention are determined and/or limited by the size of the pump chamber in regard to the stroke and volume of the pump proper and depends on the outside pressure to which the open ends of the U-tubes are subjected.

Figs. 1 through 7 illustrate the invention more in principle than to a specific construction. The large branches of the U-tubes may be reduced in areas not touched by the liquid and the efficiency of the pump would be increased significantly as increased suction and increased pressure would be attained. In using the valve for a pump for pumping liquid, the valve could be partially filled with a liquid of lower specific gravity which would not mix with the liquid to be pumped.

The number of strokes per minute a pump with liquid valves can perform is limited by the natural cycling frequency of liquids in each test tube. The natural cycling frequency of liquids in the U-tubes depends on the size and condition of the tubes used and the viscosity of liquids pumped. In the case where the pump chamber is filled with a liquid of lighter gravity than the liquid to be pumped, the number of strokes per minute is limited by the size of the U-tubes and especially by the size of the small branch of the U-tube which performs the exhaust cycle. The liquid in the small branch of the U-tubes should be given sufficient time to leave this branch without producing considerable back pressure.

It will be apparent that an efficient yet simple valve has been devised that will permit the pumping of gases or liquids from one container to another without bringing any of the pumped gases or liquids into contact with the pumping mechanism.

It is to be understood that the form of the invention, herewith shown and described, is to be taken as a preferred example of the same, and that various changes in the shape, size and arrangements of parts may be resorted to without departing from the spirit of the invention, or scope of the subjoined claims.

What is claimed is:

1. A fluid pump arrangement comprising, a cylindrical container having an outlet at its upper end, a cylinder of less diameter than said container having a closed bottom end concentrically disposed within and in sealed relation with said container, said bottom end of said cylinder being spaced from the floor of said container, a pump diaphragm fixed to the upper end of said cylinder, an inlet tube entering the upper wall of said cylinder and bent over to extend downwardly towards the bottom thereof, said inlet tube being of smaller diameter than the diameter of said cylinder, an outlet tube rising from the floor of said cylinder, said outlet tube communicating between said container and said cylinder and being of less diameter than said cylinder and said container and a liquid partially filling said container, said cylinder, said outlet tube and said inlet tube, said liquid acting upon the operation of said diaphragm as valves to maintain a flow of fluid from said inlet tube, said cylinder, said container and said outlet tube.

2. A fluid pump arrangement comprising, a cylindrical container having an outlet duct at its upper end, a cylinder of less diameter than said container and having a closed bottom end, said cylinder being concentrically within and in sealed relation with said container, said bottom end of said cylinder being spaced from the floor of said container, a pump diaphragm fixed to the upper end of said cylinder, an inlet tube entering the upper wall of said cylinder, said inlet tube being of less diameter than said cylinder and bending over to extend downwardly towards the bottom of said cylinder, an outlet tube having a diameter less than said cylinder and said container, said outlet tube carried by and extending upwardly from said bottom of said cylinder and providing communication between said container and said cylinder, and a liquid having a specific gravity lower than the fluid to be pumped partially filling said container, said cylinder, said outlet tube and submerging the lower portion of said inlet tube, said liquid acting upon operation of said diaphragm to maintain a flow of fluid from said inlet tube, said cylinder, said container and said outlet tube.

References Cited in the file of this patent

UNITED STATES PATENTS

| | | |
|---|---|---|
| 1,630,943 | Hutton | May 31, 1927 |
| 1,932,582 | Halvorson | Oct. 31, 1933 |
| 2,670,692 | Grace | Mar. 2, 1954 |